(12) United States Patent
Löbbert et al.

(10) Patent No.: US 11,486,855 B2
(45) Date of Patent: Nov. 1, 2022

(54) ELECTROCHEMICAL SENSOR (71) Applicant: Endress+Hauser Conducta GmbH+Co. KG, Gerlingen (DE)

(72) Inventors: Andreas Löbbert, Waldheim (DE); Michael Hanko, Dresden (DE)

(73) Assignee: ENDRESS+HAUSER CONDUCTA GMBH+CO. KG, Gerlingen (DE)

( * ) Notice: Subject to any disclaimer, the term of this patent is extended or adjusted under 35 U.S.C. 154(b) by 237 days.

(21) Appl. No.: 16/695,761

(22) Filed: Nov. 26, 2019

(65) Prior Publication Data
US 2020/0166477 A1 May 28, 2020

(30) Foreign Application Priority Data

Nov. 27, 2018 (DE) ...................... 10 2018 129 968.0

(51) Int. Cl.
*G01N 27/40* (2006.01)
*G01N 27/333* (2006.01)
*G01N 27/36* (2006.01)
*G01N 27/416* (2006.01)

(52) U.S. Cl.
CPC ..... *G01N 27/4163* (2013.01); *G01N 27/3335* (2013.01); *G01N 27/40* (2013.01); *G01N 27/4161* (2013.01); *G01N 27/36* (2013.01)

(58) Field of Classification Search
CPC ............... G01N 27/305; G01N 27/333; G01N 27/3335; G01N 27/36; G01N 27/40;
(Continued)

(56) References Cited

U.S. PATENT DOCUMENTS 5,951,837 A    9/1999  Craig et al.
6,441,057 B1   8/2002  Kimball
(Continued)

FOREIGN PATENT DOCUMENTS

CN    103175878 A    6/2013
CN    107037107 A    8/2017
(Continued)

OTHER PUBLICATIONS

Lobbert, DE 10 2015 122 463 machine translation (Year: 2015).*
(Continued)

*Primary Examiner* — Luan V Van
*Assistant Examiner* — Caitlyn Mingyun Sun
(74) *Attorney, Agent, or Firm* — Christopher R. Powers; Endress+Hauser (USA) Holding Inc.

(57) ABSTRACT

The present disclosure relates to an electrochemical sensor for determining a measurand correlating with a concentration of an analyte in a measuring fluid, comprising: a sensor membrane designed to be in contact with the measuring fluid for detecting measured values of the measurand; a probe housing which has at least one immersion region designed for immersion into the measuring fluid, wherein the sensor membrane is arranged in the immersion region of the probe housing; and a measurement circuit which is at least partially contained in the probe housing and is designed to generate and output a measurement signal dependent on the measurand, wherein the sensor membrane contains an optically detectable substance for marking the sensor membrane.

15 Claims, 2 Drawing Sheets

(58) Field of Classification Search
CPC ............ G01N 27/4161; G01N 27/302; G01N 27/4035; G01N 2035/00772; C03C 4/18; C03C 4/06; C09L 11/06; B01L 2200/141; B01L 2300/021; C09K 11/06; C09K 2211/1055

See application file for complete search history.

(56) References Cited

U.S. PATENT DOCUMENTS

2013/0161191 A1* 6/2013 Wilhelm .............. G01N 27/401 29/25.03
2017/0160228 A1* 6/2017 Pechstein ............. G01N 27/333

FOREIGN PATENT DOCUMENTS

| | | |
|---|---|---|
| CN | 107064248 A | 8/2017 |
| DE | 102004033303 A1 | 11/2005 |
| DE | 102008039465 A1 | 3/2010 |
| DE | 102014112792 A1 | 3/2016 |
| DE | 102015122463 A1 | 6/2017 |
| DE | 102016120581 A1 | 5/2018 |
| DE | 102016123586 A1 | 6/2018 |
| DE | 102016123700 A1 | 6/2018 |
| WO | 2008049632 A1 | 5/2008 |

OTHER PUBLICATIONS

A. Das, Enhancement of upconversion luminescence using photonic nanostructures, Nanophotonics, 2020, 20200159, p. 1-13. (Year: 2020).*

C. Sun et al., Fabrication of a multilayer film electrode containing porphyrin and its application as a potentiometric sensor of iodide ion, Talanta 1998(46), p. 15-21. (Year: 1998).*

* cited by examiner

ELECTROCHEMICAL SENSOR

CROSS-REFERENCE TO RELATED APPLICATION

The present application is related to and claims the priority benefit of German Patent Application No. 10 2018 129 968.0, filed on Nov. 27, 2018, the entire contents of which are incorporated herein by reference.

TECHNICAL FIELD

The present disclosure relates to an electrochemical sensor for determining a measurand correlating with a concentration of an analyte in a measuring fluid.

BACKGROUND

Such sensors are used for the analysis of measuring media, especially measuring fluids, in laboratory and process metrology in many fields of chemistry, biochemistry, pharmacy, biotechnology, food technology, water management, and environmental metrology. The substance whose concentration is to be measured by means of the electrochemical sensor is also referred to as an analyte. Analytes can, for example, be certain chemical substances dissolved in a measurement liquid, e.g., ions or dissolved gases.

Sensor membranes, which have different properties depending on the measuring principle used, serve to detect measurands representing the analyte concentration in electrochemical sensors. This is illustrated below with reference to the examples of potentiometric and amperometric sensors for determining analyte concentrations.

Potentiometric sensors for measuring analyte concentrations typically include a measuring half cell, also referred to as a measuring electrode, and a reference half cell, also referred to as a reference electrode, as well as a measurement circuit. The measuring electrode and the reference electrode are brought into contact with the measuring medium for measurement. In contact with the measuring medium, the measuring electrode develops a potential that is a function of the activity of the analyte in the measuring medium, whereas the reference electrode provides a stable reference potential independent of the analyte concentration. The measurement circuit generates an analog or digital measuring signal which represents the potential difference (measurement voltage) between the measuring electrode and the reference electrode and, consequently, the activity of the analyte in the measuring medium. The measurement signal is output from the measurement circuit, if applicable to a superordinate data processing unit which is connected to the sensor and further processes the measurement signal.

The measuring electrode is typically designed as an ion-selective electrode (ISE). This comprises an ion-selective sensor membrane serving as a potential-forming sensor element. The ion-selective sensor membrane closes off a housing of the measuring electrode in which is accommodated a potential-sensing system which is in contact with the sensor membrane. This can comprise a fixed discharge line or an inner electrolyte which is contacted by an electrically conductive discharge electrode. The discharge system is connected to the measurement circuit. The reference electrode is designed to provide a stable reference potential. For example, it can be designed as a silver/silver chloride electrode. The reference electrode is also connected to the measurement circuit.

The sensor membrane and the reference electrode of the potentiometric sensor are brought into contact with the measuring medium for measurement. The sensor membrane selectively interacts with the analyte dissolved in the measuring medium. The sensor membrane is specially designed for this purpose; for example, there are pH-sensitive glasses which essentially interact selectively with $H^+$ ions in the measuring medium or other membranes, e.g., ionophore-containing polymer membranes which selectively interact with a specific ion. By changing the activity of the analyte in the measuring medium, a relative change of the equilibrium Galvani potential is produced between the measuring medium and the discharge line of the measuring electrode. This correspondingly leads to a measurable change in the voltage detected by the measurement circuit between the discharge line of the measuring electrode and the reference electrode.

Amperometric sensors are often used for measuring the concentration of gases dissolved in a measuring medium, for example, oxygen, chlorine, or chlorine dioxide. They have at least two, often also three electrodes. One of the electrodes is used as a working electrode, another as a counterelectrode. A current flow between the working electrode and the counterelectrode is used to determine the measurand. In many amperometric applications, the potential of the working electrode, or the current flow through the working electrode, is regulated by means of a third reference electrode through which current does not flow. A potential-stable electrode of the second type, for example, a silver/silver chloride electrode, can serve as reference electrode, for example. The electrodes are electrically conductively connected to a measurement circuit which, given an amperometric measuring probe, is normally a component of a measurement circuit accommodated in a probe housing with the electrodes. A chamber which is closed off by a sensor membrane, and in which an inner electrolyte is accommodated, is often formed in the probe housing. The electrodes are in contact with the inner electrolyte. The sensor membrane is permeable, especially selectively permeable, to the analyte.

For the measurement, the sensor membrane is brought into contact with the measuring medium, wherein the concentration of the analyte present in the inner electrolyte is adjusted as a function of the concentration present in the measuring medium. The current flow, which can be detected when an analyte-dependent polarization voltage is applied between the working electrode and counter-electrode (2-electrode structure) or between the working electrode and reference electrode (3-electrode structure), is detected by the measurement circuit as a measure of the analyte concentration in the measuring medium.

In the course of their service life, sensor membranes of electrochemical sensors are subject to aging, which can lead to a gradual deterioration of the sensor properties, for example, a sensor drift. The aging of the sensor membranes, which is unavoidable even under moderate conditions of use, is intensified by extreme conditions of use, for example, by sterilization processes or contact with aggressive media such as strong acids or alkaline solutions. By means of a regular calibration, the aging of the sensor membranes can be compensated to a certain extent, and thus the operating time of the sensors can be extended. However, if the properties of the sensor membrane have changed to such an extent that a sufficient measurement quality of the sensor is no longer ensured, the sensor membrane or the sensor must be taken out of operation. Sensor membranes of amperometric sensors, as well as measuring electrodes of potentiometric sensors or potentiometric measuring probes as a whole, are therefore frequently wearing parts which are replaced regularly.

For example, there are amperometric sensors which have a sensor body and a membrane cap that can be connected to the sensor body so as to be detachable. Such sensors are described in DE 10 2008 039465 A1 and DE 10 2016 120581 A1, for example. Whereas the sensor body contains long-lived electrical or electronic components of the sensor that serve to detect and process measurement signals, the membrane cap comprises the substantially more short-lived sensor membrane. The membrane cap can be replaced with a new membrane cap having a new, similar sensor membrane if the sensor membrane is damaged or can no longer be used due to signs of aging.

Ion-selective electrodes or combination electrodes with an ion-selective electrode and a reference electrode are often designed as probes which can be connected to a superordinate unit which takes over at least part of the signal processing and/or signal evaluation. If the sensor membrane of the ion-selective electrode is damaged or can no longer be used due to aging, the electrode or the combination electrode can be replaced.

These exchangeable sensor parts are therefore independently offered for purchase as accessories for sensors or measuring stations. In order to ensure an optimal function of the exchangeable sensor parts with the remaining sensor components that can be connected thereto, care should be taken to combine only sensor membranes which are suitable and/or matched to the other sensor components for the respective application in which the new sensor membrane is to be used. By contrast, if the new sensor membrane is designed and specified for other applications than the previously used sensor membrane, the functionality of the sensor can be impaired, both with regard to the measurement of the analyte concentration and also with regard to possible diagnostic functions of the sensor. This applies even more when the sensor membrane is of lower quality or has been manipulated (e.g., product piracy). A mix-up of sensor membranes or the use of sensor membranes, possibly of lower quality, that are not intended for the other sensor components should therefore be excluded with certainty. A marking provided on a package of the replacement part does not appear sufficiently certain to prevent unintended mix-ups or manipulations.

SUMMARY

The object of the present disclosure is to specify an electrochemical sensor which comprises a sensor membrane which has a secure identifier for identification, wherein the identifier cannot be manipulated or forged, or this can only be done with very great effort.

This object is achieved by an electrochemical sensor according to claim 1, a membrane cap according to claim 13, and a method according to claim 16 for testing and/or identifying a sensor membrane. Advantageous embodiments are listed in the dependent claims.

The electrochemical sensor according to the present disclosure for determining a measurand correlating with a concentration of an analyte in a measuring fluid comprises:

a sensor membrane designed to be in contact with the measuring fluid for detecting measured values of the measurand;

a probe housing having at least one immersion region designed for immersion into the measuring fluid, wherein the sensor membrane is arranged in the immersion region of the probe housing; and a measurement circuit which is at least partially contained in the probe housing and is designed to generate and output a measurement signal dependent on the measurand, wherein the sensor membrane contains an optically detectable substance to mark the sensor membrane.

By using an optically detectable substance contained in the sensor membrane to mark the sensor membrane, an identification of the sensor membrane is possible via a simple optical test method. It is thus possible to test whether a sensor membrane is suitable for use with a specific sensor body, or for use in a specific application or at a specific measuring point. In a specific use case, the marking can also provide protection against product piracy.

The sensor membrane can cover an electrolyte-filled interior space formed in the probe housing, in which interior space is arranged at least one electrode connected to the measurement circuit.

In an advantageous embodiment, the optically detectable substance can be detectable from outside the probe housing. Thus, the marking of the sensor membrane can be performed by means of a testing device for performing an optical detection of the substance, without needing to remove the sensor membrane from the probe housing or open the probe housing.

In one possible embodiment, the electrochemical sensor is a potentiometric sensor.

In this instance, the probe housing may contain an ion-selective electrode and a reference electrode, both of which are connected to the measurement circuit. The sensor membrane thereby forms the ion-selective sensor membrane of the ion-selective electrode.

The sensor membrane may comprise a layer of an ion-selective glass doped with the optically detectable substance. For example, the sensor membrane can be formed from a pH-sensitive glass for pH measurement which is doped with the optically detectable substance. Alternatively, the sensor membrane can comprise a first layer of an ion-selective glass and a second layer of a polymer doped with the optically detectable substance, said second layer at least partially covering this first layer.

The sensor membrane can comprise a first polymer matrix doped with the optically detectable substance. The first polymer matrix may additionally contain an ionophore for the selective detection of an ion type dissolved in the measuring medium. In this embodiment, the first polymer matrix thus contains both the ionophore and the optically detectable substance.

In addition to the first polymer matrix doped with the optically detectable substance, the sensor membrane can alternatively comprise a second polymer matrix which contains the ionophore. For example, the sensor membrane may have a layer formed from the first polymer matrix and a layer formed from the second polymer matrix. It is also possible for a plurality of particles consisting of the doped second polymer matrix to be embedded in the first polymer matrix.

In a further embodiment, the sensor can be an amperometric sensor. In this instance, a chamber which is closed off from the sensor membrane is formed in the probe housing and contains an inner electrolyte and at least two electrodes contacting the inner electrolyte. The measurement circuit is designed to apply a voltage between the electrodes and to detect a current flowing through one of the two electrodes which is serving as a working electrode.

In this embodiment, the sensor membrane may comprise a polymer which is permeable to the analyte or a reaction product of the analyte, wherein the polymer is doped with the optically detectable substance.

The optically detectable substance is advantageously a substance which, via electromagnetic radiation or by another energy input, can be excited to emit electromagnetic radiation, in particular electromagnetic radiation of a wavelength characteristic of the substance. Detection takes place in this instance by excitation of the substance and detection of the radiation emitted by the substance, for example, by means of a radiation receiver.

The optically detectable substance may, for example, be selected from the group consisting of: organometallic compounds such as metal porphyrin complexes, polyaza annulene dyes, for example, polyaza[18]annulene dyes, boron dipyrromethenes (BODIPY), azaborone dipyrromethenes (Aza-BODIPY), and metallophthalocyanine complexes.

These substances can be excited to luminescence, especially in the visible spectral range, by excitation with electromagnetic radiation.

In another embodiment, the optically detectable substance may be an upconversion material (photon upconversion material), for example, in the form of nanoparticles (UCNPs=upconversion nanoparticles).

The optically detectable substance may comprise one or more inorganic luminescent pigments which consist of an inorganic solid which itself exhibits donor-acceptor luminescence or charge transfer luminescence or is doped with one or more luminescent ions, wherein the one or more luminescent ions is or are selected from the group consisting of:

$In^+$, $Sn^{2+}$, $Pb^{2+}$, $Sb^{3+}$, $Bi^{3+}$, $Ce^{3+}$, $Ce^{4+}$, $Pr^{3+}$, $Nd^{3+}$, $Sm^{2+}$, $Sm^{3+}$, $Eu^{2+}$, $Eu^{3+}$, $Gd^{3+}$, $Tb^{3+}$, $Dy^{3+}$, $Ho^{3+}$, $Er^{3+}$, $Tm^{2+}$, $Tm^{3+}$, $Yb^{2+}$, $Yb^{3+}$, $Ti^{3+}$, $V^{2+}$, $V^{3+}$, $V^{4+}$, $Mn^{2+}$, $Mn^{3+}$, $Mn^{4+}$, $Fe^{3+}$, $Fe^{4+}$, $Fe^{5+}$, $Co^{3+}$, $Co^{4+}$, $Ni^{2+}$, $Cu^+$, $Ru^{2+}$, $Ru^{3+}$, $Pd^{2+}$, $Ag^+$, $Ir^{3+}$, $Pt^{2+}$, and $Au^+$.

The optically detectable substance may comprise an electrochromic material.

A membrane cap for an electrochemical sensor for determining a measurand correlating with a concentration of an analyte in a measuring fluid, according to one of the embodiments described above, comprises:

a sensor membrane which is designed to be in contact with the measuring fluid for detecting measured values of the measurand, and which contains an optically detectable substance for marking the sensor membrane, and a housing, for example, a cylindrical housing, which is terminated at an end face by the sensor membrane.

Such a membrane cap can advantageously be used for an amperometric sensor in order to replace a no longer usable sensor membrane with a new sensor membrane. In this embodiment, the sensor membrane of the membrane cap may comprise a polymer which is permeable to the analyte or a reaction product of the analyte, wherein the polymer is doped with the optically detectable substance.

On its side opposite the end face, the housing can be designed to be connected to a probe body so as to be detachable. The probe body may comprise electrodes and a measurement circuit. In the state in which they are connected with one another, the membrane cap and the probe body can enclose a chamber containing at least a portion of the electrodes. Before the membrane cap is connected to the probe body, the membrane cap can be filled with an inner electrolyte, so that the chamber enclosed by the membrane cap and the probe body contains the inner electrolyte and the electrodes contact the inner electrolyte.

The present disclosure also relates to a method for testing and/or identifying a sensor membrane of an electrochemical sensor, comprising a testing step in which whether the sensor membrane contains an optically detectable substance is checked by means of an optical detection method. The testing step may comprise the following steps:

exciting the optically detectable substance to emit electromagnetic radiation;

detecting a signal of a radiation receiver configured to receive radiation emitted by the optically detectable substance contained in the membrane and convert it into an electrical signal; and determining, on the basis of the detected signal, whether the sensor membrane contains the optically detectable substance.

The optically detectable substance can be excited by radiating excitation radiation of one or more specific wavelengths into the sensor membrane. The excitation radiation can be radiated into the sensor membrane from inside or outside of a probe housing of the electrochemical sensor. The radiation receiver can be arranged outside of the probe housing to detect the signal.

The excitation of the optically detectable substance, the detection of the signal of the radiation receiver, and the determination of whether the sensor membrane contains the optically detectable substance can take place by means of a test device. The test device can have, for example, a radiation source whose radiation serves to excite the optically detectable substance. The radiation receiver can likewise be integrated into the test device. The test device can further comprise an electronic circuit which is configured to determine, based on signals from the radiation receiver, whether the radiation received by the radiation receiver corresponds to an expected emission of the optically detectable substance. This can be performed by comparing a characteristic of the radiation received by the optical radiation receiver with a target characteristic stored, for example, in the test device, e.g., in the form of one or more reference values. The characteristic may, for example, be a wavelength, an intensity, an intensity profile, a spectrum, or a phase angle.

It is also possible for the test device to be integrated into the electrochemical sensor. For example, the sensor may include the radiation source and the radiation receiver. Furthermore, the sensor can comprise a sensor circuit which is connected to the radiation source and the radiation receiver and serves to implement the method described here. It is also possible for the sensor circuit to be connected to a superordinate unit, for example, a measuring transducer and/or an operating device, which implements the test.

In addition, a further test step can be carried out, comprising:

testing, by means of a further method, for example, an optical or chemical method, whether the sensor membrane contains the optically detectable substance.

If the testing yields that the sensor membrane contains an optically detectable substance, the method can further comprise identifying the optically detectable substance. The identification can, for example, take place on the basis of the signal of the radiation receiver that was detected in the optical detection method, or on the basis of a value derived therefrom, with reference values, wherein each reference value represents a specific optically detectable substance. Such reference values may, for example, be intensities, phase angles, or wavelengths of absorption or luminescence maxima. The identification, like the test, can also be performed by the test device, the sensor circuit, and/or a superordinate unit.

As described, the optically detectable substance contained in the sensor membrane forms a captive, non-manipulatable marking of the sensor membrane. This may serve not only to identify the sensor membrane as suitable for a particular application or to counteract product piracy. Additionally or alternatively, a traceability of the sensor membrane can also be ensured by means of an optically detectable substance introduced into the sensor membrane. This can be used by the manufacturer of the sensor membranes. For example, a first optically detectable substance may be added to the sensor membranes produced over a certain first time period, for example, during a year or a month. After the end of the first time period, a second optically detectable substance that differs from the first can be added to the sensor membranes produced in a subsequent second time period. The first and the second optically detectable substances can be selected in such a way that they emit radiation of different wavelengths upon excitation, or are excited to emit radiation by excitation radiation of different wavelengths. In this way, sensor membranes produced in the first and second time periods can be distinguished from one another.

Analogously, different optically detectable substances can also be used for different production batches of sensor membranes. In the event of quality defects of individual production batches of sensor membranes, for example, this makes it possible to locate all specimens of the appertaining sensor membranes.

BRIEF DESCRIPTION OF THE DRAWINGS

The present disclosure is explained in further detail below on the basis of the exemplary embodiments shown in Figures, as follows.

DETAILED DESCRIPTION

Figure 1:
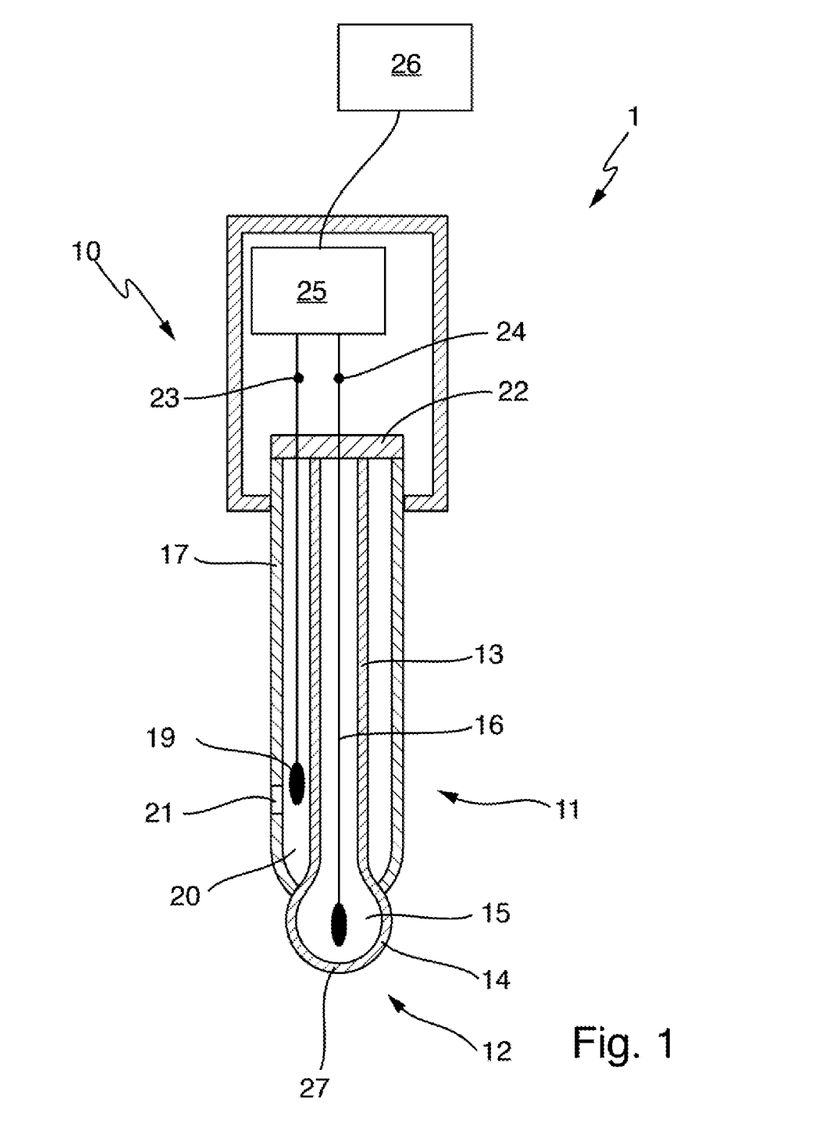
FIG. 1 shows a schematic longitudinal sectional view of an electrochemical sensor according to a first exemplary embodiment in the form of a potentiometric sensor.

FIG. 1 schematically shows a longitudinal sectional view of a potentiometric sensor 1 according to a first exemplary embodiment. The sensor 1 comprises a measuring probe 10 designed as a potentiometric combination pH electrode, comprising a measuring electrode 12 and a reference electrode 11, and a superordinate unit 26, for example, a computer or a measuring transducer. The measuring electrode 12 is accommodated in an inner tubular housing part 13, for example, made of glass or plastic, which is closed at one end by a pH-sensitive sensor membrane 14 made of a pH glass, for example, McInnes glass. A buffer solution, into which is immersed an electrically conductive potential-sensing electrode 16 which can be formed from a metal wire, is accommodated in the housing part 13 as an inner electrolyte 15. In the present example, the discharge line 16 is a silver wire coated with silver chloride. Instead of a discharge system formed by an inner electrolyte 15 and a discharge line 16 contacting the inner electrolyte 15, the measuring electrode 12 can also have a fixed discharge line.

The reference electrode 11 is arranged coaxially around the measuring electrode 12. It comprises a housing formed by an outer tubular housing part 17. The housing part 17 can, for example, consist of glass or plastic and surround the tubular housing part 13. At its end facing toward the sensor membrane 14, the housing part 17 is connected in a liquid-tight manner to the tubular housing part 13 of the measuring electrode 12. A reference electrolyte 20 in which the reference element 19 is immersed is accommodated in the annular housing chamber formed in this manner. The reference element 19 can be formed by a chloridated silver wire. During operation of the sensor 10, the reference electrolyte 20 is, via a transition 21 formed as a through-opening in the outer tubular housing part 17, in contact with a measuring medium surrounding the measuring probe 10 in its front end region which encloses the transition 21 and the sensor membrane 14. At its rear end opposite the glass membrane 14, the housing of the measuring probe 10 is sealed by potting 22. The reference element 19 and discharge element 16 are each connected to a measuring circuit 25 via a contact point 23, 24 arranged outside of the housing. The measurement circuit 25 can be accommodated in an electronic housing which, for example, can be made of plastic, fixedly connected to the housing part 17, and encapsulated if necessary.

For the measurement, an immersion region of the measuring probe 10, said immersion region comprising the sensor membrane 14 and the transition 14, is brought into contact with a measuring liquid. The measurement circuit 25 is designed to detect a difference in potential between the measuring electrode 12 and the reference electrode 11, and to output a measurement signal that represents the difference in potential. The measurement circuit 25 can be connected to the superordinate unit 26 to which it outputs the measurement signal. The connection to the superordinate unit 26 can, for example, be realized by means of a plug connection. The measurement signal is a measure of the pH value of the measuring liquid. The measurement circuit 25 or the superordinate unit 26 is designed to determine a value of the measurand, here the pH value, from the measurement signal.

The sensor membrane 14 can consist of a single glass layer which is doped with an optically detectable substance 27 over its entire cross section or only in a subregion, for example, in a transition region to the housing shank 13. In an alternative exemplary embodiment, in a subregion, for example, on its side facing the inner electrolyte 15, the sensor membrane 14 can be provided with a polymer layer which is doped with the optically detectable substance. This polymer layer is advantageously arranged on the side facing toward the inner electrolyte 15 so that it can no longer be manipulated from the outside. In order to allow undisturbed potentiometric measurement, the polymer layer does not cover the entire surface of the sensor membrane 14 that is in contact with the inner electrolyte 15.

In the exemplary embodiment illustrated in FIG. 1, the sensor membrane 14 is made of a pH-sensitive glass. Another example of a potentiometric ion sensor is a potentiometric combination electrode, with a reference electrode and a measuring electrode designed as an ion-selective electrode (ISE) having an ion-selective polymer membrane. In this instance, the measuring electrode is designed quite analogously to that of the measuring probe 10 shown in FIG. 1, with the difference that the sensor membrane is not formed from glass but rather has at least one first polymer matrix containing an ionophore for the selective detection of a specific ion type. A suitable material for the polymer matrix is, for example, silicone. Other suitable materials are known from the prior art. The first polymer matrix can additionally be doped with the optically detectable substance in order to mark the sensor membrane. Alternatively, the sensor membrane can have a further, second polymer matrix which is doped with the optically detectable substance.

The optically detectable substance 27 may be a stable organic or inorganic substance, or a hybrid material of organic and/or inorganic substances, or a mixture of organic and/or inorganic substances. Suitable materials are, for example, organometallic compounds, metal complexes such as metal porphyrin complexes, polyaza annulene dyes, metallophthalocyanine complexes, or mixtures of these compounds.

The optically detectable substance 27 may also comprise an upconversion material (photon upconversion material). These materials convert lower-energy photons into higher-energy photons in an anti-Stokes scattering process. For example, they can be organic materials, such as polycyclic aromatic hydrocarbons, or inorganic materials, such as ions of the d- or f-block elements. It is advantageous for the optically detectable substance 27 to consist of upconversion nanoparticles (upconverting nanoparticles), e.g., quantum dots or lanthanide-doped nanoparticles, such as fluorides or oxides, e.g., $NaYF_4$, $NaGdF_4$, $LiYF_4$, $YF_3$, $Gd_2O_3$, doped with $Er^{3+}$, $Yb^{3+}$, $Tm^{3+}$, or several of these lanthanides.

In further exemplary embodiments, the optically detectable substance 27 can be a stable inorganic material, for example, an inorganic luminescence pigment from the series of solid phase substances that exhibit a donor-acceptor luminescence or charge transfer luminescence. For example, they may contain one or more ions from the following group: $In^+$, $Sn^{2+}$, $Pb^{2+}$, $Sb^{3+}$, $Bi^{3+}$, $Ce^{3+}$, $Ce^{4+}$, $Pr^{3+}$, $Nd^{3+}$, $Sm^{2+}$, $Sm^{3+}$, $Eu^{2+}$, $Eu^{3+}$, $Gd^{3+}$, $Tb^{3+}$, $Dy^{3+}$, $Ho^{3+}$, $Er^{3+}$, $Tm^{2+}$, $Tm^{3+}$, $Yb^{2+}$, $Yb^{3+}$, $Ti^{3+}$, $V^{2+}$, $V^{3+}$, $V^{4+}$, $Cr^{3+}$, $Mn^{2+}$, $Mn^{3+}$, $Mn^{4+}$, $Fe^{3+}$, $Fe^{4+}$, $Fe^{5+}$, $Co^{3+}$, $Co^{4+}$, $Ni^{2+}$, $Cu^+$, $Ru^{2+}$, $Ru^{3+}$, $Pd^{2+}$, $Ag^+$, $Ir^{3+}$, $Pt^{2+}$, and $Au^+$. They may further comprise a binary, ternary, or quaternary halide, oxide, oxyhalide, sulfide, oxysulfide, sulfate, oxysulfate, selenide, nitride, oxynitride, nitrate, oxynitrate, phosphide, phosphate, carbonate, silicate, oxysilicate, vanadate, molybdate, tungstate, germanate, or oxygermanate. These may contain cations of the elements Li, Na, K, Rb, Mg, Ca, Sr, Sc, Y, La, Ti, Zr, Hf, Nb, Ta, Zn, Gd, Lu, Al, Ga, and In.

The inorganic material can be present in the sensor membrane 14 as a doping or as nanoparticles embedded in a layer of the sensor membrane. The doping or the nanoparticles may form an image or text marking, for example, in the form of a lettering, a number, or a logo, for example, in the form of a hologram.

In an alternative embodiment, the optically detectable substance 27 may also be an electrochromic material. Such materials change color as a result of an electrical pulse; examples of this are indium tin oxide (ITO), Prussian blue or Berlin blue, lithium tungsten oxide, and fluorine tin oxide. In this instance, the sensor membrane 14 can comprise electrodes or be in contact with electrodes via which a voltage can be applied to the sensor membrane 14 or to a layer of the sensor membrane 14 comprising the optically detectable substance 27, said voltage being dimensioned in such a way that a color change of the optically detectable substance 14 occurs and can be detected optically.

As an optically detectable substance 27, a substance can also be used which changes its color under the influence of a specific influencing variable, e.g., when the pressure or temperature changes or when irradiated with electromagnetic radiation.

In order to ensure a universal applicability of the sensor membrane 14, it is advantageous if all materials that are used are sterilizable up to a temperature of at least 140° C. and/or autoclavable up to at least 121° C., and are stable with respect to customary cleaning and disinfecting agents such as, for example, sodium hydroxide solution or ethylene dioxide. Advantageously, the materials that are used can also be selected such that they also withstand sterilization with gamma radiation at a dose of at least 5 kGy without degenerating.

The optically detectable substance 27 is also advantageously stable up to a temperature of 140° C. and chemically stable with respect to acids, alkaline solutions, and customary disinfectants such as ethylene oxide. However, this is not strictly necessary if the optically detectable substance is to be used only as a marking of the sensor membrane 14 in order to verify its origin or its suitability for use with a specific sensor body or a specific application during a first installation of the sensor membrane 14. A later destruction of the optically detectable substance 27 when the sensor is used is then not an issue, since detection of the substance 27 is no longer necessary then.

If the measuring probe 10 can no longer be used, for example, because the sensor membrane 14 is damaged or has aged to such an extent that sufficient measurement quality is no longer ensured, it can be replaced by a new, similar measuring probe 10. In order to ensure that the new measuring probe 10 meets the desired requirements, or to ensure that a product of desired quality is used, a user can check whether the sensor membrane of the new measuring probe 10 contains the optically detectable substance 27 before the new measuring probe 10 is used. How the test is performed will be described in more detail below.

Figure 2:
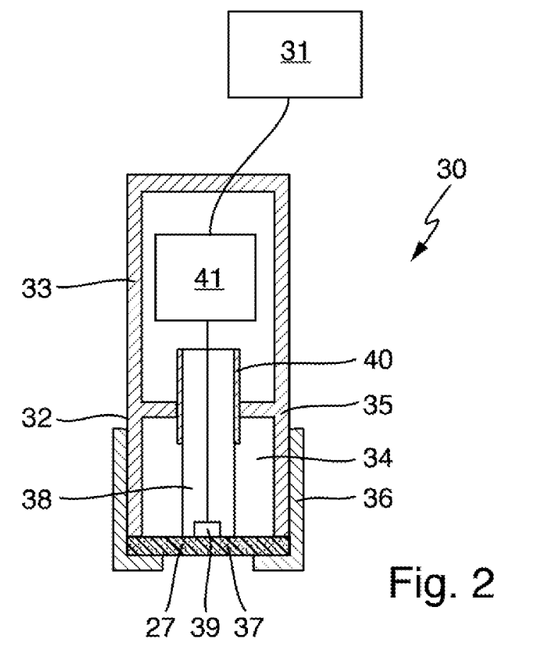
FIG. 2 shows a schematic longitudinal sectional view of an electrochemical sensor according to a second exemplary embodiment in the form of an amperometric sensor having an exchangeable membrane cap.

FIG. 2 shows as a further exemplary embodiment a schematic longitudinal section of an amperometric sensor 30 for determining an analyte concentration in a measuring fluid, e.g., dissolved oxygen or free chlorine. The amperometric sensor 30 comprises evaluation electronics 31, for example, a computer or a measuring transducer, and a measuring probe 32 connected to the evaluation electronics 31. The measuring probe 32 has a substantially cylindrical probe housing 33 which is formed from a probe body 35 and a membrane cap 36 placed on the probe body 35. The membrane cap 36 can be connected to the probe body 35 by, for example, a threaded connection or another releasable connection. The membrane cap 36 is cylindrical and closed at one end by a sensor membrane 37. When the membrane cap 36 is placed on the probe body, together with the front end of the probe body 35 it encloses a chamber 34 containing an inner electrolyte. The chamber 34 is sealed in a liquid-tight manner with respect to the remaining sensor body 33 and the surroundings, so that the inner electrolyte cannot escape from the chamber 34.

Arranged in the probe body 35 is a cylindrical electrode support 38 made of an insulating material, for example, a plastic, which has a first electrode 39 at its end facing toward the sensor membrane 37. In the example shown here, the electrode carrier 38 has a second tubular electrode 40 which surrounds the electrode carrier 38 at its end facing away from the sensor membrane 37. The sensor membrane 37 rests against the end face of the electrode carrier 38 with the first electrode 39, so that only a thin film of the inner electrolyte is located between the sensor membrane 37 and the first electrode 39.

The first electrode 39 and the second electrode 40 are connected, via electrical lines guided out of the chamber 34, to a measurement circuit 41 arranged in the probe body 35. The measurement circuit 41 is designed to apply a specific polarization voltage between the first electrode 39 serving as the working electrode and the second electrode 40 serving as the counter electrode, and to detect the current which is flowing through the working electrode at this polarization voltage. This is a measure of the concentration of the analyte in a measuring fluid in contact with the sensor membrane 37. The measurement circuit 41 is further designed to output a measurement signal representing the detected current to the superordinate unit 31. The superordinate unit 31 is configured to determine from the measurement signal a value of the measurand, e.g., the analyte concentration.

Like the sensor membrane of the potentiometric sensor 10 shown in FIG. 1, the sensor membrane 37 of the amperometric sensor 30 shown in FIG. 2 contains an optically detectable substance 27. In the present example, the sensor membrane 37 consists of a material which is permeable to a gas to be detected by the amperometric sensor 30 and which is dissolved in a measuring liquid. For example, the membrane may consist of silicone, porous or non-porous PVDF, PVF, Teflon AF, Hyflon AD, Nafion, a copolymer or terpolymer or n-polymer with a polystyrene unit, e.g., polystyrene co-vinylpyridine, polystyrene co-vinylpyridine co-divinylbenzene, or a blend of several of said polymers, doped with the optically detectable substance 27 or containing nanoparticles of the optically detectable substance. The substances mentioned above in connection with the exemplary embodiment illustrated in FIG. 1 are suitable as an optically detectable substance 27 for marking the sensor membrane 37.

If the sensor membrane 37 needs to be replaced, for example, because it can no longer continue to be used due to aging phenomena, the membrane cap 36 can be detached from the sensor body 35 and replaced by a similar membrane cap 36 with a new sensor membrane 37. The sensor membrane 37 contains the optically detectable substance 27 as a marking that is captively connected to the sensor membrane 37. If the sensor membrane 37 is replaced by changing the membrane cap 36, this can serve to check whether the new sensor membrane to be used is suitable for use with the sensor body 35 and/or for use at the measuring point formed by the measuring probe 32 and the superordinate unit 31.

In addition to this application of the marking, formed by the optically detectable substance 27, of the sensor membranes 14, 37 of the electrochemical sensors described here as examples, the marking can also serve as protection against forgeries (product piracy) or against manipulation. Furthermore, the marking may also be used for monitoring a production method for the sensor membranes or sensors, for example, in order to avoid mix-ups of the sensor membranes during production, storage, or distribution of the sensor membranes or accessories for the sensor membranes, for example, membrane caps. The optically detectable substance can especially be used to enable a traceability of sensor membranes which are handed over to users, or of accessory parts comprising the sensor membranes. As a result, costs incurred as a result of membranes incorrectly associated with or incorrectly installed in the sensors can be avoided.

If different production batches of sensor membranes are provided with different optically detectable substances, the batches can be distinguished from one another using these identifiers. As a result, when a fault occurring in only one batch is detected, all the appertaining sensor membranes can be identified and removed from circulation.

Figure 3:
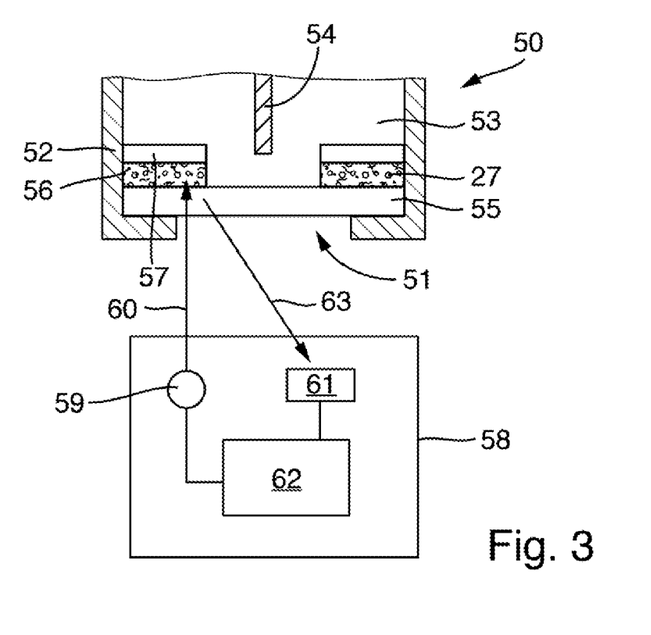
FIG. 3 schematically shows the sensor membrane with a testing device for identifying the sensor membrane.

The procedure for testing and/or identifying the sensor membrane 51 by means of optical detection is described below on the basis of an ion-selective sensor membrane 51 of a potentiometric sensor having an ISE 50 serving as a measuring electrode, shown schematically in a sectional view in FIG. 3. FIG. 3 shows only the front end of the ISE 50 intended for immersion in a measuring fluid. Otherwise, the potentiometric sensor is constructed quite analogously to the pH sensor 1 shown in FIG. 1. The sensor membrane 51 is mounted in a probe housing 52 and, at the end face, closes off a chamber 53 formed in the probe housing 52. An inner electrolyte which is electrically contacted by an electrically conductive potential-sensing electrode 54 is accommodated in the chamber 53.

In the exemplary embodiment shown here, the sensor membrane 51 is constructed from a plurality of layers. It comprises a first layer 55 formed from a first polymer matrix containing an ionophore. The ionophore selectively interacts with ions of the ion type whose concentration is to be measured by means of the ISE 50. An annular second layer 56 which is formed from a second polymer matrix is applied in an edge region on the surface of the first layer 55 that faces toward the chamber 53. The second polymer matrix is doped with an optically detectable substance 27. This substance 27 can be one of the substances mentioned above in connection with the other exemplary embodiments, which substances can be excited via excitation radiation to emit radiation, for example, by luminescence. In order to ensure that the highest possible intensity of the radiation emitted by the optically detectable substance 27 is detectable outside of the probe housing, in the exemplary embodiment shown here a reflection layer 57 is arranged on the side of the second layer 56 facing toward the chamber 53. However, this is only optionally present; the testing of the sensor membrane 51 as described below is also possible in principle without such a reflection layer 57. The reflection layer 57 contains, for example, TiO2 particles at which the radiation emitted by the optically detectable substance 27 is backscattered.

In order to test and/or identify a sensor membrane 51, an optical, non-destructive detection of the optically detectable substance 27 present in the sensor membrane 51 can be performed by means of a testing device 58. The testing device 58 has a radiation source 59 designed to generate excitation radiation 60 of a wavelength or wavelength range that is suitable for excitation of the optically detectable substance 27. The radiation source 59 may have one or more narrowband LEDs, or one or more multi-LEDs, or a broadband light source. In addition, the testing device 58 comprises a radiation receiver 61 which is suitable for detecting the radiation 63 emitted by the optically detectable substance 27, and for generating a signal dependent on the intensity of the detected radiation. The radiation receiver 61 may, for example, have a photodiode or a photodiode array or a CCD array. The radiation receiver 61 may also comprise a spectrometer that is configured to determine a wavelength- or frequency-resolved intensity distribution. The testing device 58 also comprises test electronics 62 connected to the radiation receiver 61 and the radiation source 59 and configured to control the radiation source 59 and receive and process signals from the radiation receiver 61. The test electronics 62 may be configured to output the wavelength and/or intensity of received radiation emitted by the optically detectable substance 27, e.g., via a display of the testing device 58 (not shown in FIG. 3). In this instance, a user can radiate excitation radiation 60 generated by means of the radiation source 59 into the sensor membrane 51. On the basis of the display of the test device 58 that is generated from the signal of the radiation receiver 61, the user can recognize whether or not a currently tested sensor membrane 51 contains the optically detectable substance 27.

The test electronics 62 can alternatively or additionally also be configured to check whether the currently tested sensor membrane 51 contains the optically detectable substance 27. For this purpose, an expected wavelength and/or radiation characteristic of the radiation 63 emitted by the optically detectable substance 27 after excitation can be stored in a memory of the test electronics 62. The test electronics 62 can evaluate the signals received from the radiation receiver 61 and decide, on the basis of a comparison with the data stored in the test electronics 62, e.g., reference values, whether the optically detectable substance 27 is present in the sensor membrane 51. The test electronics 62 can output the result of this decision via a display.

Optionally, there is also the further alternative possibility of testing the sensor membrane 51 by means of a chemical or spectroscopic method, which typically takes place by destroying the sensor membrane 51.

However, the testing is preferably performed non-destructively. For especially difficult or critical instances, destructive measurement may serve as an additional proof, for example, when testing a contiguous batch of a plurality of sensor membranes. In this instance, a single one of the plurality of membranes can be destructively examined in order to additionally confirm the results of the non-destructive testing of the remaining membrane.

Suitable optical methods for non-destructive measurement with an additional device or with the means of the optochemical sensor itself are, for example, an optical luminescence measurement, an optical absorption measurement, or an x-ray measurement, depending on the type of optically detectable substance 27 that is used. Atomic absorption spectroscopy or flame emission spectroscopy may be used as destructive methods, for example, wet-chemical or spectroscopic methods.

All measurement methods known to the person skilled in the art, e.g., detection of an intensity change, of a phase angle, of a decay time, of an absorption, or of a reflection, may be used for optical luminescence or absorption measurements. Specifically, the following measurements can be used:
a) emission signal or emission spectrum when excited with one or more specific wavelength(s);
b) emission signal or emission spectrum when excited with one or more specific wavelength(s);
c) absorption signal or absorption spectrum measured in reflection;
d) polarization of radiation emitted by or converted by the optically detectable substance, measurable by means of a polarization filter;
e) optical signals (e.g., absorption signal measured in reflection) as a function of the temperature, the pressure, a voltage applied to the sensor membrane;
f) visual detection of discoloration upon change in temperature, pressure, application of a voltage.

Identification or testing can be performed in a particularly reliable manner by using more than one measurement method. For example, two different non-destructive optical methods, e.g., a luminescence measurement and an absorption measurement in reflection, or two luminescence measurements in which different parameters are detected, e.g., a phase angle and a decay time, can be used for the optical detection of the optically detectable substance.

In a further advantageous variant, the optically detectable substance can be irreversibly variable due to ambient conditions which lead to an above-average shortening of the service life of the sensor membrane, such as higher temperatures than permitted by specification or other improper treatment of the sensor. In this way, testing of the optically detectable substance allows conclusions to be drawn about the remaining service life of the sensor membrane.

The marking of sensor membranes by means of the optically detectable substance can also be used to mark sensor membranes that are used for determining a concentration of a specific analyte. For example, a sensor membrane that serves to detect a first analyte can be marked with a first optically detectable substance, whereas a sensor membrane that serves to detect a second analyte can be marked with another, second optically detectable substance.

This makes it possible to convert a sensor completely automatically (in the sense of a "plug & play" functionality) from a sensor for determining the concentration of the first analyte to a sensor for determining the concentration of the second analyte, by changing the sensor membrane. This presupposes that the sensor body 36 comprises detection means adapted for the detection of different analytes. This is described below with reference to an example of an amperometric sensor as shown in FIG. 2.

Parameters which serve to determine different measurands, for example, concentrations of different analytes, can be stored in a memory of the evaluation circuit 31 or of the measurement circuit 41. For example, for measuring a concentration of a first analyte (e.g., free chlorine), a first parameter set comprising, for example, a polarization voltage, calibration data, and a temperature coefficient can be stored, and a second parameter set with corresponding parameters can be stored for measuring the concentration of a second analyte (e.g., free bromine or ozone). It is thus possible to convert the sensor by exchanging a first sensor membrane which is intended for measuring the concentration of the first analyte for a second sensor membrane which is intended for measuring the second analyte by respectively selecting the parameter set matching the sensor membrane. The membrane replacement is advantageously effected by replacing a first membrane cap 36 with a second membrane cap 36, wherein the membrane caps 36 in this instance contain different sensor membranes 37.

In this application, the optically detectable substance 27 can serve to identify the type of analyte that can be determined by means of the sensor membrane 37. This can be done automatically by the sensor itself. On the basis of the identified type of analyte, the sensor can select the parameters used for this analyte and stored in memory and use them for determining the measured value.

In this instance, a radiation source and a radiation receiver are advantageously integrated into the probe body 35 and are connected to a sensor circuit which can be a component of the measurement circuit 41. The sensor circuit, or the evaluation electronics 31 connected to the sensor circuit for communication, can be configured to check, on the basis of an optical detection method, whether an optically detectable substance 27 is contained in a sensor membrane 37 which is connected to the probe body 35 by means of the membrane cap 36 and, if so, to identify the substance 27. The optical detection method can be performed quite analogously to the test method described in connection with FIG. 3, wherein the example described here does not use a separate testing device, but rather optics and electronics integrated into the sensor. The identification of the optically detectable substance 27 can, for example, take place on the basis of the signal of the radiation receiver as detected in the optical detection method, or on the basis of a value derived therefrom with a catalog of reference values, wherein each reference value represents a specific optically detectable substance. Each reference value simultaneously corresponds to a specific analyte which can be determined by means of the sensor membrane 37. Such reference values may, for example, be intensities, phase angles, or wavelengths of absorption or luminescence maxima. Based on a correspondence of the optical signal or the value derived therefrom with one of the reference values, the optically detectable substance or the corresponding analyte can be identified as the substance represented by the reference value or, respectively, as the analyte to be measured. On the basis of the identified substance, the sensor can thus select and apply the parameters to be subsequently used for measurements.

The invention claimed is:

1. An electrochemical sensor for determining a measurand correlating with a concentration of an analyte in a measuring fluid, the sensor comprising:
    a sensor membrane configured to contact the measuring fluid and operable to detect measured values of the measurand;
    a probe housing that includes at least one immersion region adapted for immersion into the measuring fluid, wherein the sensor membrane is disposed in the at least one immersion region of the probe housing; and
    a measurement circuit at least partially contained in the probe housing and configured to generate and output a measurement signal dependent on the measurand,
    wherein the sensor membrane contains an optically detectable substance, and wherein the sensor membrane is configured such that the sensor membrane is identifiable via the optically detectable substance.

2. The sensor of claim 1, wherein the optically detectable substance can be detected from outside of the probe housing.

3. The sensor of claim 1, wherein the sensor is a potentiometric sensor.

4. The sensor of claim 3, wherein the sensor membrane comprises a layer of an ion-selective glass that is doped with the optically detectable substance, or comprises a first layer of an ion-selective glass and a second layer of a polymer doped with the optically detectable substance.

5. The sensor of claim 3, wherein the sensor membrane comprises a first polymer matrix that is doped with the optically detectable substance.

6. The sensor of claim 5, wherein the sensor membrane comprises a second polymer matrix containing at least one ionophore.

7. The sensor of claim 1, wherein the sensor is an amperometric sensor.

8. The sensor of claim 7, wherein the sensor membrane comprises a polymer that is permeable to the analyte or a reaction product of the analyte, wherein the polymer is doped with the optically detectable substance.

9. The sensor of claim 1, wherein the optically detectable substance is selected from a group consisting of organometallic compounds, including at least one of: metal porphyrin complexes, polyaza annulene dyes, polyaza[18]annulene dyes, boron dipyrromethenes (BODIPY), azaborone dipyrromethenes (Aza-BODIPY), and metallophthalocyanine complexes.

10. The sensor of claim 1, wherein the optically detectable substance is an upconversion material.

11. The sensor of claim 1, wherein the optically detectable substance comprises one or more inorganic luminescent pigments that consist of an inorganic solid which itself exhibits donor-acceptor luminescence or charge transfer luminescence, or is doped with one or more luminescent ions, wherein the one or more luminescent ions are selected from the group consisting of $In^+$, $Sn^{2+}$, $Pb^{2+}$, $Sb^{3+}$, $Bi^{3+}$, $Ce^{3+}$, $Ce^{4+}$, $Pr^{3+}$, $Nd^{3+}$, $Sm^{2+}$, $Sm^{3+}$, $Eu^{2+}$, $Eu^{3+}$, $Gd^{3+}$, $Tb^{3+}$, $Dy^{3+}$, $Ho^{3+}$, $Er^{3+}$, $Tm^{2+}$, $Tm^{3+}$, $Yb^{2+}$, $Yb^{3+}$, $Ti^{3+}$, $V^{2+}$, $V^{3+}$, $V^{4+}$, $Mn^{2+}$, $Mn^{3+}$, $Mn^{4+}$, $Fe^{3+}$, $Fe^{4+}$, $Fe^{5+}$, $Co^{3+}$, $Co^{4+}$, $Ni^{2+}$, $Cu^+$, $Ru^{2+}$, $Ru^{3+}$, $Pd^{2+}$, $Ag^+$, $Ir^{3+}$, $Pt^{2+}$, and $Au^+$.

12. The sensor of claim 1, wherein the optically detectable substance comprises an electrochromic material.

13. A membrane cap adapted for an electrochemical sensor operable to determine a measurand correlating with a concentration of an analyte in a measuring fluid, the membrane cap comprising:
    a sensor membrane configured to contact the measuring fluid and operable to detect measured values of the measurand, the sensor membrane containing an optically detectable substance, wherein the sensor membrane is further configured as to be identifiable via the optically detectable substance; and
    a cap housing that is closed off at one end face by the sensor membrane,
    wherein the electrochemical sensor comprises:
        the sensor membrane;
        a probe housing that includes at least one immersion region adapted for immersion into the measuring fluid, wherein the probe housing is configured to enable the membrane cap to be reversibly attached thereto, and wherein the sensor membrane is disposed in the at least one immersion region of the probe housing; and
        a measurement circuit at least partially contained in the probe housing and configured to generate and output a measurement signal dependent on the measurand.

14. The membrane cap of claim 13, wherein the cap housing is configured to be detachably connected to a sensor body on a side of the cap housing opposite the end face.

15. The membrane cap of claim 13, wherein the sensor membrane comprises a polymer that is permeable to the analyte or a reaction product of the analyte, and wherein the polymer is doped with the optically detectable substance.

* * * * *

UNITED STATES PATENT AND TRADEMARK OFFICE
CERTIFICATE OF CORRECTION

| | |
|---|---|
| PATENT NO. | : 11,486,855 B2 |
| APPLICATION NO. | : 16/695761 |
| DATED | : November 1, 2022 |
| INVENTOR(S) | : Andreas Löbbert and Michael Hanko |

It is certified that error appears in the above-identified patent and that said Letters Patent is hereby corrected as shown below:

On the Title Page (72) Inventors
Insert --SPECK, Matthäus, Göpfersdorf (DE)-- after inventor "HANKO, Michael, Dresden (DE)".

Signed and Sealed this
Fourteenth Day of May, 2024

Katherine Kelly Vidal
*Director of the United States Patent and Trademark Office*